(12) United States Patent
Lampton

(10) Patent No.: US 12,271,212 B2
(45) Date of Patent: Apr. 8, 2025

(54) COUNTERBALANCE VALVE WITH ENHANCED PRESSURE SENSING FEATURES

(71) Applicant: Sun Hydraulics, LLC, Sarasota, FL (US)

(72) Inventor: Chad Lampton, Sarasota, FL (US)

(73) Assignee: Sun Hydraulics, LLC, Sarasota, FL (US)

( * ) Notice: Subject to any disclaimer, the term of this patent is extended or adjusted under 35 U.S.C. 154(b) by 108 days.

(21) Appl. No.: 18/349,251

(22) Filed: Jul. 10, 2023

(65) Prior Publication Data
US 2025/0021114 A1   Jan. 16, 2025

(51) Int. Cl.
G05D 16/10 (2006.01)
F16K 31/122 (2006.01)
F16K 31/383 (2006.01)

(52) U.S. Cl.
CPC ....... *G05D 16/103* (2013.01); *F16K 31/1221* (2013.01); *F16K 31/1223* (2013.01); *F16K 31/1226* (2013.01); *F16K 31/1228* (2013.01); *F16K 31/383* (2013.01)

(58) Field of Classification Search
USPC ................................................ 251/26, 44
See application file for complete search history.

(56) References Cited

U.S. PATENT DOCUMENTS

| | | | | |
|---|---|---|---|---|
| 2,619,112 A * | 11/1952 | Renick | ........... | F16K 17/105 |
| | | | | 251/44 |
| 4,149,565 A * | 4/1979 | Jennings | ........... | F16K 31/40 |
| | | | | 251/44 |
| 4,494,726 A * | 1/1985 | Kumar | ........... | F16K 31/408 |
| | | | | 251/44 |
| 4,577,831 A | 3/1986 | DiBartolo | | |
| 4,630,640 A | 12/1986 | DiBartolo | | |
| 4,742,846 A | 5/1988 | DiBartolo | | |
| 4,834,135 A | 5/1989 | DiBartolo | | |
| 4,873,817 A | 10/1989 | Harms | | |
| 5,381,823 A | 1/1995 | DiBartolo | | |
| 5,878,647 A * | 3/1999 | Wilke | ........... | F16K 31/408 |
| | | | | 137/596.1 |
| 6,039,070 A | 3/2000 | Zahe | | |
| 6,640,830 B2 | 11/2003 | Zahe | | |

(Continued)

OTHER PUBLICATIONS

Non-Final Office Action issued by the U.S. Patent Office in U.S. Appl. No. 16/860,227 dated Feb. 15, 2022.

*Primary Examiner* — Matthew W Jellett
(74) *Attorney, Agent, or Firm* — McDonnell Boehnen Hulbert & Berghoff LLP

(57) ABSTRACT

An example counterbalance valve includes: a first port, a second port, and a pilot port configured to receive a pilot pressure fluid signal; a poppet configured to move axially to allow fluid flow from the first port to the second port via a main flow region, wherein the poppet comprises a sensing port that is exposed to fluid at a sensing flow region, wherein the sensing flow region is fluidly coupled to the second port and is shifted axially from the main flow region such that the sensing flow region is separated from turbulent flow in the main flow region; and a pressure setting spring disposed in a spring chamber and applying a biasing force on the poppet in a distal direction.

18 Claims, 9 Drawing Sheets

(56) References Cited

U.S. PATENT DOCUMENTS

| | | | |
|---|---|---|---|
| 6,869,060 B2 * | 3/2005 | Barber | F15B 13/0433 251/30.02 |
| 7,219,592 B2 | 5/2007 | Nielsen et al. | |
| 8,424,836 B2 * | 4/2013 | Ma | F16K 31/406 251/44 |
| 9,810,242 B2 | 11/2017 | Wang | |
| 10,428,845 B1 | 10/2019 | Bianchi et al. | |
| 10,437,269 B1 | 10/2019 | Zahe | |
| 10,626,892 B1 | 4/2020 | Zahe | |
| 10,775,812 B1 | 9/2020 | Zahe | |
| 2003/0106588 A1 | 6/2003 | Zaehe | |
| 2006/0201554 A1 | 9/2006 | Prisen et al. | |
| 2019/0301495 A1 | 10/2019 | Bianchi et al. | |
| 2020/0393856 A1 | 12/2020 | Zahe | |
| 2021/0332899 A1 | 10/2021 | Zahe | |
| 2021/0332901 A1 * | 10/2021 | Zähe | F16K 17/06 |

* cited by examiner

1000

```
┌─────────────────────────────────────────────┐
│ APPLYING A FIRST FLUID FORCE ON A POPPET OF A │
│ COUNTERBALANCE VALVE IN A PROXIMAL DIRECTION, WHEREIN THE │
│ COUNTERBALANCE VALVE COMPRISES A FIRST PORT, A SECOND │
│ PORT, AND A PILOT PORT, AND WHEREIN THE FIRST FLUID FORCE IS │──1002
│ APPLIED BY FLUID RECEIVED AT THE FIRST PORT, WHEREIN THE │
│ POPPET COMPRISES A SENSING PORT THAT IS EXPOSED TO FLUID AT │
│ A SENSING FLOW REGION FLUIDLY COUPLED TO THE SECOND PORT │
└─────────────────────────────────────────────┘
                      ↓
┌─────────────────────────────────────────────┐
│ APPLYING A SECOND FLUID FORCE ON THE POPPET IN THE PROXIMAL │
│ DIRECTION BY A PILOT PRESSURE FLUID SIGNAL RECEIVED AT THE │──1004
│ PILOT PORT │
└─────────────────────────────────────────────┘
                      ↓
┌─────────────────────────────────────────────┐
│ APPLYING A BIASING FORCE ON THE POPPET IN A DISTAL DIRECTION │──1006
│ BY A PRESSURE SETTING SPRING DISPOSED IN A SPRING CHAMBER │
└─────────────────────────────────────────────┘
                      ↓
┌─────────────────────────────────────────────┐
│ PROVIDING A SENSING SIGNAL FROM THE SECOND PORT TO THE │
│ SPRING CHAMBER VIA THE SENSING FLOW REGION AND THE SENSING │──1008
│ PORT │
└─────────────────────────────────────────────┘
                      ↓
┌─────────────────────────────────────────────┐
│ APPLYING A THIRD FLUID FORCE ON THE POPPET IN THE DISTAL │──1010
│ DIRECTION BY THE SENSING SIGNAL │
└─────────────────────────────────────────────┘
                      ↓
┌─────────────────────────────────────────────┐
│ MOVING THE POPPET TO A PARTICULAR AXIAL POSITION BASED ON A │
│ FORCE EQUILIBRIUM BETWEEN THE FIRST FLUID FORCE, THE SECOND │
│ FLUID FORCE, THE THIRD FLUID FORCE, AND THE BIASING FORCE TO │
│ ALLOW FLUID FLOW FROM THE FIRST PORT TO THE SECOND PORT VIA │──1012
│ A MAIN FLOW REGION, WHEREIN THE SENSING FLOW REGION IS │
│ SHIFTED AXIALLY FROM THE MAIN FLOW REGION SUCH THAT THE │
│ SENSING FLOW REGION AND THE SENSING PORT OF THE POPPET ARE │
│ SEPARATED FROM TURBULENT FLOW IN THE MAIN FLOW REGION │
└─────────────────────────────────────────────┘
```

FIG. 10

COUNTERBALANCE VALVE WITH ENHANCED PRESSURE SENSING FEATURES

BACKGROUND

Counterbalance valves are hydraulic valves configured to hold and control negative or gravitational loads. They may be configured to operate, for example, in applications that involve the control of suspended loads, such as mechanical joints, lifting applications, extensible movable bridge, winches, etc.

In some applications, the counterbalance valve, which may also be referred to as an overcenter valve, could be used as a safety device that prevents an actuator from moving if a failure occurs (e.g., a hose burst). In other applications, it could be used as a load holding valve (e.g., on a boom cylinder of a mobile machinery). The counterbalance valve allows cavitation-free load-lowering, preventing the actuator from overrunning when pulled by the load (gravitational load).

As an example, a counterbalance valve could be used on the return side of a hydraulic actuator for lowering a large negative load in a controlled manner. The counterbalance valve generates a preload or back-pressure in the return line that acts against the main drive pressure so as to maintain a positive load, which therefore remains controllable. Particularly, if a speed of a piston of the cylinder increases, pressure on one side of the cylinder (e.g., rod side) may drop and the counterbalance valve may then act to restrict the flow to controllably lower the load.

A pilot-assisted counterbalance valve can be opened by combined action of a pilot fluid signal in a pressurized pilot line and load pressure. In one mode of operation, when a pilot fluid signal is provided to a pilot port of the valve, a movable member of the valve moves, allowing fluid flow from the first port to the second port.

Typically, a fluid signal from the second port is communicated to a spring chamber having a spring acting on the movable member. Such spring determines the pressure setting of the valve, or the pressure level at which the valve opens. By communicating the fluid signal at the second port to the spring chamber, the pressure of fluid at the second port operates as a reference pressure against which fluid at the first port and the pilot port act.

One problem with this configuration, however, is that as fluid flows from the first port to the second port, fluid at the second port can be turbulent with variable local fluid pressures and velocities. Such turbulence is then communicated to the spring chamber, rendering the performance of the valve unpredictable. For instance, such turbulent variation in the fluid signal sensed from the second port and provided to the spring chamber may cause the valve to open at a higher pressure level than expected or intended.

It may thus be desirable to provide a signal from the second port that has reduced turbulence. It is with respect to these and other considerations that the disclosure made herein is presented.

SUMMARY

The present disclosure describes implementations that relate to a counterbalance valve with enhanced pressure sensing features.

In a first example implementation, the present disclosure describes a counterbalance valve. The counterbalance valve includes: a plurality of ports comprising: a first port, a second port, and a pilot port configured to receive a pilot pressure fluid signal; a poppet configured to move axially to allow fluid flow from the first port to the second port via a main flow region, wherein the poppet comprises a sensing port that is exposed to fluid at a sensing flow region, wherein the sensing flow region is fluidly coupled to the second port and is shifted axially from the main flow region such that the sensing flow region is separated from turbulent flow in the main flow region; and a pressure setting spring disposed in a spring chamber and applying a biasing force on the poppet in a distal direction, wherein the spring chamber is fluidly coupled to the sensing flow region via the sensing port of the poppet. The poppet is configured to be subjected to (i) a first fluid force by fluid received at the first port acting on the poppet in a proximal direction, (ii) a second fluid force by the pilot pressure fluid signal received at the pilot port acting on the poppet in the proximal direction, and (iii) a third fluid force by fluid of the second port communicated to the spring chamber via the sensing port and acting on the poppet in the distal direction, and wherein the poppet is configured to move to a particular axial position based on a force equilibrium between the first fluid force, the second fluid force, the third fluid force, and the biasing force to allow fluid flow from the first port to the second port.

In a second example implementation, the present disclosure describes a hydraulic system including the counterbalance valve of the first example implementation.

In a third example implementation, the present disclosure describes a method of operating the counterbalance valve of the first example implementation.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 10 a flowchart of a method for operating a counterbalance valve, in accordance with an example implementation.

DETAILED DESCRIPTION

A counterbalance valve can have a spring that acts against a movable element (e.g., a spool or a poppet), and the force of the spring determines a pressure setting of the counterbalance valve. The pressure setting is a pressure level that causes the counterbalance valve to open and allow fluid flow therethrough. The counterbalance valve is configured to open when a combined force resulting from action of load pressure at a first port of the valve and action of a pilot pressure signal provided to a pilot port of the valve overcomes the spring of the counterbalance valve, thereby moving the movable member and allowing fluid to flow from the first port to a second port.

In example counterbalance valves, a fluid signal is sensed from the second port and provided to the spring chamber to act as a reference pressure level against which the pressure of the pilot signal and the load pressure act. Turbulence at the second port as fluid flows from the first port to the second port can cause the pressure level of the fluid signal from the second port to fluctuate or unintentionally increase, which may be undesirable.

Disclosed herein is a counterbalance valve that alleviates this issue by shifting the sensing location from which the pressure signal from the second port is communicated to the spring chamber. Particularly, the sensing location is shifted such that the sensing location is separated from the turbulent flow location. This way, a "clean" signal with reduced or eliminated turbulence is provided to the spring chamber.

Figure 1:
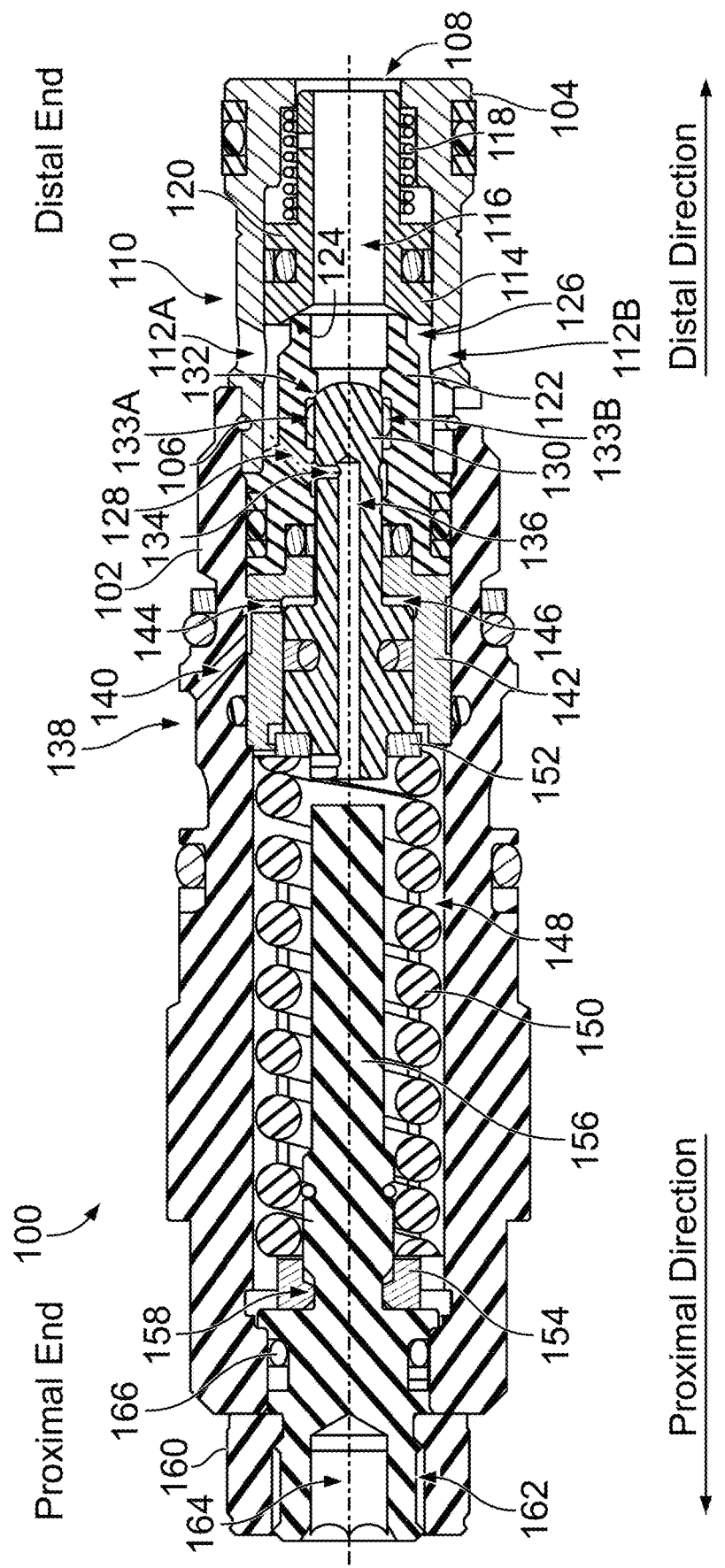
FIG. 1 illustrates a cross-sectional side view of a counterbalance valve in a neutral position, in accordance with an example implementation.

FIG. 1 illustrates a cross-sectional side view of a counterbalance valve 100 in a neutral position, in accordance with an example implementation. The counterbalance valve 100 may be inserted or screwed into a manifold having ports corresponding to ports of the counterbalance valve 100 described below, and may thus fluidly couple the counterbalance valve 100 to other components of a hydraulic system.

The counterbalance valve 100 includes a housing 102 that defines a longitudinal cylindrical cavity therein. The counterbalance valve 100 also includes a sleeve 104 that is disposed at least partially in the housing 102. Particularly, the sleeve 104 is received at a distal or first end of the housing 102 and protrudes distally outward therefrom. The sleeve 104 is retained within the housing 102 via a wire ring 106.

In an example, the sleeve 104 defines a first port 108 and a second port 110. The first port 108 is defined at a nose or distal end of the sleeve 104 and can be referred to as a load port, for example. The second port 110 can be referred to be as an exhaust port and can include a set of main flow cross-holes such as main flow cross-hole 112A and main flow cross-hole 112B. The mina flow cross-holes can be disposed in an array (e.g., a circular array) about a wall of the sleeve 104.

The term "hole" is used generally herein to indicate a hollow place (e.g., cavity) in a solid body or surface, for example. The term "cross-hole" indicates a hole that crosses a path of, or is formed transverse relative to, another hole, cavity, or channel.

The sleeve 104 defines a respective longitudinal cylindrical cavity therein. The counterbalance valve 100 includes a reverse flow piston 114 that is disposed, and is axially-movable, in the longitudinal cylindrical cavity of the sleeve 104. The reverse flow piston 114 is referred to as a "reverse flow" piston because it is configured to allow fluid flow from the second port 110 to the first port 108 as described below with respect to FIG. 9. The term "piston" is used herein to encompass any type of movable element, such as a spool-type movable element or a poppet-type movable element.

A main chamber 116 is formed within the sleeve 104, and the reverse flow piston 114 is hollow such that interior space of the reverse flow piston 114 is comprised in the main chamber 116. The main chamber 116 is fluidly coupled to the first port 108.

The counterbalance valve 100 further includes a reverse flow check spring 118. A distal end of the reverse flow check spring 118 rests against a protrusion or shoulder formed in the sleeve 104, while a proximal end of the reverse flow check spring 118 acts against a flange 120 projecting radially outward from the reverse flow piston 114. With this configuration, the distal end of the reverse flow check spring 118 is fixed, whereas the proximal end of the reverse flow check spring 118 is movable and interfaces with the reverse flow piston 114. This way, the reverse flow check spring 118 biases the reverse flow piston 114 in the proximal direction (e.g., to the left in FIG. 1). Further, another shoulder formed in the sleeve 104 acts as a stop for the flange 120 of the reverse flow piston 114 when the reverse flow piston 114 moves in the distal direction (see FIG. 9).

The counterbalance valve 100 further includes a seat member 122 disposed within the sleeve 104 and the housing 102. A distal end of the seat member 122 operates as a piston seat 124 at which the reverse flow piston 114 is seated in the state shown in FIG. 1.

The seat member 122 has a reduced diameter distal portion such that an annular chamber 126 is formed between an exterior surface of the seat member 122 and an interior surface of the sleeve 104. As depicted, the annular chamber 126 is fluidly coupled to the main flow cross-holes 112A, 112B of the second port 110. The seat member 122 further includes a seat member sensing cross-hole 128 that is fluidly coupled to the annular chamber 126. The term "fluidly coupled" is used throughout herein to indicate that fluid can flow or be communicated between two fluid passages, chambers, ports, or openings.

The counterbalance valve 100 further includes a poppet 130 that is disposed, at least partially, and is axially-movable, within the seat member 122. When the counterbalance valve 100 is in a closed position that prevents fluid flow from the first port 108 to the second port 110, the poppet 130 is seated at or on a poppet seat 132 formed by an internal protrusion of the seat member 122. The poppet 130 can be referred to as a main piston or spool.

The seat member 122 has seat member main flow cross-holes, such as seat member main flow cross-hole 133A and seat member main flow cross-hole 133B, formed in a circular array about the seat member 122 and are fluidly coupled to the annular chamber 126. When the poppet 130 is seated at the poppet seat 132, the poppet 130 blocks the seat member main flow cross-holes 133A, 133B, and prevents fluid flow from the first port 108 to the second port 110.

The poppet 130 has a sensing port 134. In the example implementation shown in the Figures, the sensing port 134 is configured as a sensing cross-hole that is fluidly coupled or exposed to the seat member sensing cross-hole 128, and is thus fluidly coupled to the second port 110 via the annular chamber 126 and the main flow cross-holes 112A, 112B. The sensing port 134 is also fluidly coupled or connected to a longitudinal channel 136 formed in the poppet 130. This way, the sensing port 134 and the longitudinal channel 136 operate as sensing features that sense pressure level at the second port 110 and communicate a fluid signal having such pressure level therethrough.

The counterbalance valve 100 further includes a third port that can be referred to as a pilot port 138. The pilot port 138 comprises a pilot cross-hole 140 disposed in the housing 102 and configured to communicate a pilot pressure fluid signal received at the pilot port 138.

The counterbalance valve 100 also includes a spacer 142 disposed proximal to the seat member 122 and disposed around the poppet 130. As depicted, the spacer 142 has an undercut or annular groove that receives fluid from the pilot cross-hole 140, and the spacer 142 further includes a spacer cross-hole 144 that communicates fluid from such annular groove to an annular space 146 formed between an enlarged diameter section of the poppet 130 and the spacer 142. The pilot pressure fluid signal received at the pilot port 138 can thus apply a force on the poppet 130 in the proximal direction (e.g., to the left in FIG. 1).

The counterbalance valve 100 includes a spring chamber 148 formed within the housing 102. The longitudinal channel 136 of the poppet 130 is fluidly coupled to the spring chamber 148. This way, the sensing port 134 and the longitudinal channel 136 communicate the sensed pressure level at the second port 110 to the spring chamber 148.

The counterbalance valve 100 further includes a pressure setting spring 150 disposed in the spring chamber 148. A distal end of the pressure setting spring 150 rests against a spring cap 152 (e.g., a ring member) mounted to and interfacing with a proximal end of the poppet 130. The counterbalance valve 100 also includes an adjustable nut 154 interfacing with the pressure setting spring 150, i.e., a proximal end of the pressure setting spring 150 rests against the adjustable nut 154.

The pressure setting spring 150 is disposed about an exterior surface of an adjusting pin 156, and the adjustable nut 154 is threadedly engaged with the adjusting pin 156 via threads 158. The adjusting pin 156 is also threadedly coupled to a nut 160 via threads 162, and the nut 160 interfaces with the proximal end of the housing 102, thereby causing the adjusting pin 156 to be coupled and retained to the housing 102. The threads 162 are configured such that the adjusting pin 156 is allowed to rotate, but the adjusting pin 156 does not move axially.

Threads of the threads 158, however, are configured such that as the adjusting pin 156 rotates, the adjustable nut 154 moves axially within the spring chamber 148 to compress or decompress the pressure setting spring 150. For example, the threads 158 can be configured such that if the adjusting pin 156 rotates in a counter-clockwise direction, the adjustable nut 154 moves in the proximal direction, thereby relaxing or decompressing the pressure setting spring 150. Conversely, if the adjusting pin 156 rotates in a clockwise direction, the adjustable nut 154 moves in the distal direction, thereby compressing the pressure setting spring 150.

With this configuration, the adjusting pin 156 operates as a set screw where a tool can be inserted into a cavity 164 at the head of the adjusting pin 156 to rotate it and adjust the length of the pressure setting spring 150. Adjusting the length of the pressure setting spring 150 changes the preload or biasing force that the pressure setting spring 150 applies on the spring cap 152, which is also applied to the poppet 130 coupled thereto, in the distal direction. When the pressure setting spring 150 is compressed (i.e., the adjustable nut 154 moves in the distal direction), the biasing force of the pressure setting spring 150 increases. On the other hand, when the pressure setting spring 150 is decompressed (i.e., the adjustable nut 154 moves in the proximal direction), the biasing force of the pressure setting spring 150 decreases.

Further, the spring chamber 148 is sealed (i.e., is not vented to the external environment of the counterbalance valve 100) by way of a seal 166 (e.g., an O-ring) disposed in an annular groove about the exterior surface of the adjusting pin 156, between the adjusting pin 156 and the interior surface of the housing 102. As mentioned above, the spring chamber 148 is fluidly coupled to the second port 110 via the sensing features of the poppet 130. As such, the pressure level in the spring chamber 148 can be substantially the same as pressure level of fluid at the second port 110.

In some applications, it may be desirable to maintain a particular pressure level in a return line that fluidly couples a chamber of a hydraulic actuator to the second port 110. For instance, it may be desirable to maintain a pressure level of 100 psi or more in the return line. When the return line is pressurized (as opposed to having an atmospheric pressure level), stability of the hydraulic system in those applications may be enhanced. The seal 166 ensures that such pressure is maintained in the spring chamber 148 as opposed to venting the spring chamber 148 to the atmosphere. Further, by having the seal 166, contaminants from the external environment are prevented from entering the spring chamber 148.

The counterbalance valve 100 is shown in FIG. 1 in a neutral position at which the pressure setting spring 150 is completely relaxed or decompressed, such that the pressure setting spring 150 does not preload the poppet 130. Particularly, as depicted, there is a small axial space between the proximal end of the pressure setting spring 150 and the adjustable nut 154, indicating that the pressure setting spring 150 is completely relaxed and assumes its full decompressed length.

In this state, fluid at the first port 108 having a low pressure level (e.g., trapped pressure in a line connecting the counterbalance valve 100 to a hydraulic actuator) can move the poppet 130 in the proximal direction, thereby unseating the poppet 130 off the poppet seat 132, exposing the seat member main flow cross-holes 133A, 133B. At such position, fluid is allowed to flow from the first port 108 through the main chamber 116, around the poppet 130 (unseated), through the seat member main flow cross-holes 133A, 133B, through the annular chamber 126 and the main flow cross-holes 112A, 112B of the second port 110.

When it is desired to operate the counterbalance valve 100 as a load-holding valve that blocks fluid at the first port 108 until pressure level of fluid at the first port 108 (and/or pressure level of the pilot fluid signal at the pilot port 138) reach a particular level, the adjusting pin 156 is rotated to compress the pressure setting spring 150. The pressure setting spring 150 thus applies a biasing force on the poppet 130, and the biasing force determines the pressure setting of the counterbalance valve 100 as described below.

Figure 2:
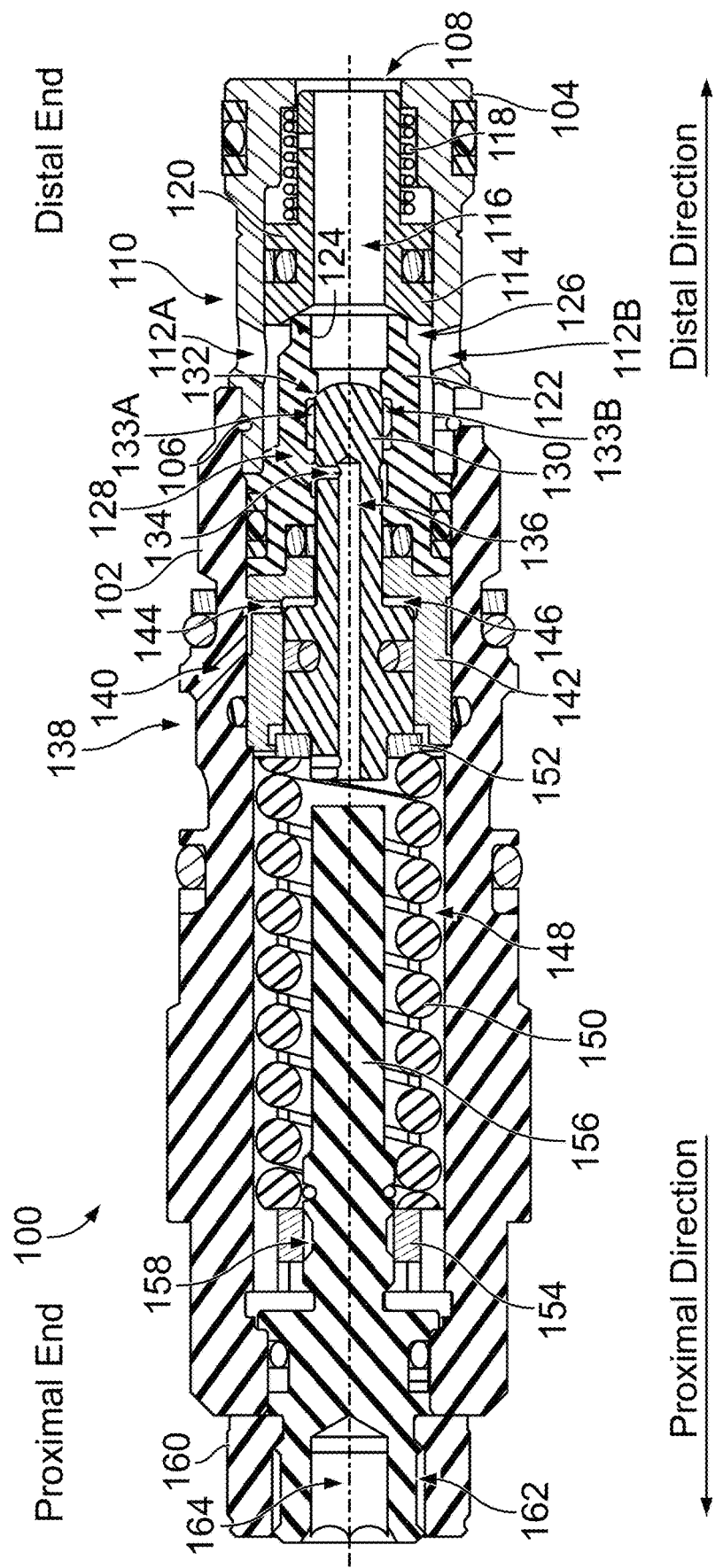
FIG. 2 illustrates a cross-sectional side view of the counterbalance valve of FIG. 1 in a load-holding position, in accordance with an example implementation.

FIG. 2 illustrates a cross-sectional side view of the counterbalance valve 100 in a load-holding position, in accordance with an example implementation. Comparing FIG. 2 to FIG. 1, the adjustable nut 154 has moved in the distal direction (e.g., via rotating the adjusting pin 156 in a given direction), thereby compressing the pressure setting spring 150 and causing the pressure setting spring 150 to apply a preload or biasing force on the poppet 130 toward the poppet seat 132.

The spring constant k of the pressure setting spring determines a magnitude of the biasing force applied on the poppet 130 in the distal direction. Such biasing force determines the pressure setting of the counterbalance valve 100, where the pressure setting is the pressure level of fluid at the first port 108 at which the counterbalance valve 100 can open to provide fluid to the second port 110.

Specifically, based on the spring constant k of the pressure setting spring 150 and its length, the pressure setting spring 150 exerts a particular preload or biasing force on the poppet 130 in the distal direction, thus causing the poppet 130 to be seated at the poppet seat 132 of the reverse flow piston 114. The pressure setting of the counterbalance valve 100 can be determined by dividing the biasing force that the pressure setting spring 150 applies to the poppet 130 by a circular area $A_1$ associated with a diameter of the distal portion of the poppet 130.

Thus, the biasing force of the pressure setting spring 150 determines the pressure setting of the counterbalance valve 100. The biasing force can be adjusted to vary the pressure setting of the counterbalance valve 100 as desired via the adjusting pin 156.

The counterbalance valve 100 is configured to operate in different modes of operation. In a first mode of operation, the counterbalance valve 100 operates in a pilot modulation mode where a pilot fluid signal is provided to the pilot port 138, and where the combined fluid forces of fluid at the first port 108 and the pilot fluid signal from the pilot port 138 cause the poppet 130 to move axially to a substantially fully-open position and allow flow from the first port 108 to the second port 110.

Figure 3:
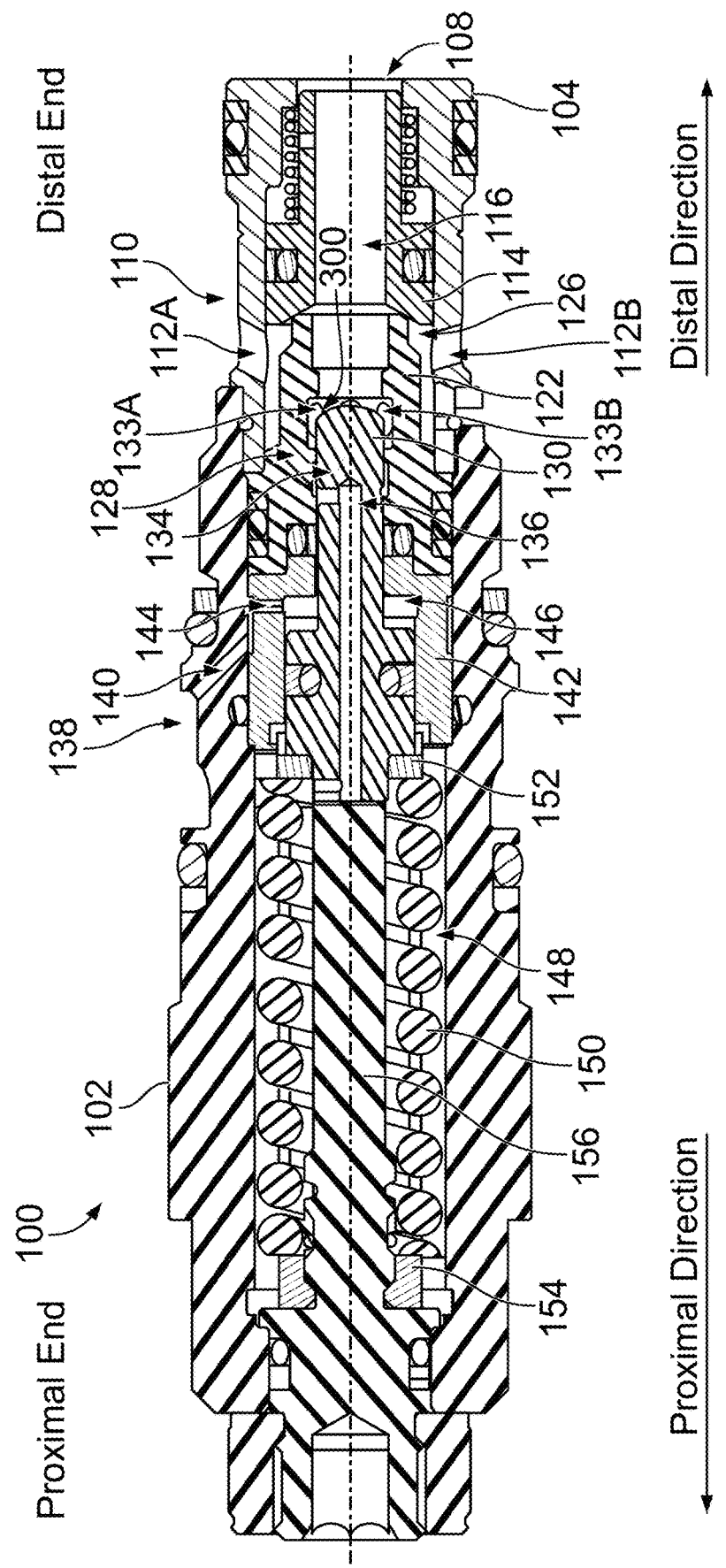
FIG. 3 illustrates a cross-sectional side view of the counterbalance valve of FIG. 1 operating in a pilot open mode of operation, in accordance with an example implementation.

FIG. 3 illustrates a cross-sectional side view of the counterbalance valve 100 operating in a pilot open mode of operation, in accordance with an example implementation. Particularly, FIG. 3 shows the poppet 130 at a fully open position (e.g., the poppet 130 has moved a maximum axial distance in the proximal direction). This may occur when the pilot fluid signal provided to the pilot port 138 exceeds a particular threshold. However, providing a pilot fluid signal having a pressure level less than such threshold pressure can cause the poppet 130 to move to a different axial position between the seated position and the fully open position. As such, the axial position of the poppet 130 can be modulated or proportionally controlled via the pressure level of the pilot fluid signal.

In the pilot modulation mode of operation, pressurized fluid received at the first port 108 applies a first fluid force in the proximal direction on a circular surface area of a distal face or distal end of the poppet 130 having a cross-sectional area $A_1$. Thus, the first fluid force can be determined as $(F_1 = P_1 \cdot A_1)$, where $P_1$ is the pressure level of fluid at the first port 108.

Further, the pilot pressure fluid signal received at the pilot port 138 is communicated through the pilot cross-hole 140 and the spacer cross-hole 144 to the annular space 146. The pilot pressure fluid signal communicated to the annular space 146 then applies a second fluid force in the proximal direction on an annular surface of the poppet 130. Particularly, assuming the enlarged diameter proximal portion of the poppet 130 has cross-sectional surface area $A_3$, the pilot pressure fluid signal applies the force on an effective annular surface area that is determined as $A_3 - A_1$. Thus, the second fluid force can be determined as $F_2 = P_p \cdot (A_3 - A_1)$, where $P_p$ is the pressure level of the pilot pressure fluid signal.

Further, fluid at the second port 110 is communicated through the seat member sensing cross-hole 128, the sensing port 134, and the longitudinal channel 136 to the spring chamber 148. Such fluid in the spring chamber 148 applies a force on the poppet 130 in the distal direction. Thus, fluid from the second port 110 applies a third fluid force on the poppet 130 in the distal direction on a cross-sectional area equal to $A_3$. The third fluid force can be determined as $F_3 = P_2 \cdot A_3$, where $P_2$ is the pressure level of fluid at the second port 110.

As such, the first and second fluid forces applied by fluid from the first port 108 and by the pilot pressure fluid signal, respectively, act on the poppet 130 in the proximal direction, while the third fluid force of fluid from the second port 110 and the biasing force of the pressure setting spring 150 act on the poppet 130 in the distal direction. When the first and second fluid forces overcome the biasing force of the pressure setting spring 150 and the third fluid force acting on the poppet 130 in the distal direction, the poppet 130 can move off the poppet seat 132 and is displaced in the proximal direction as depicted in FIG. 3.

Particularly, comparing FIG. 3 to FIG. 1, the poppet 130 has moved proximally and the pressure setting spring 150 is compressed. The pressure setting spring 150 is compressed by an amount equal the axial distance that the poppet 130 has moved. As the pressure setting spring 150 is compressed, the biasing force it applies on the poppet 130 increases.

The poppet 130 can move in the proximal direction to a particular axial position at which a force equilibrium is achieved between the first fluid force and the second fluid force acting in the proximal direction and the biasing force of the pressure setting spring 150 and the third fluid force acting in the distal direction.

As depicted in FIG. 3, the poppet 130 has moved off the poppet seat 132, and thus a flow area 300 is formed between the seat member 122 and the poppet 130, where the size of the flow area 300 is based on the extent of axial movement of the poppet 130, i.e., based on the axial position at which the force equilibrium is achieved. As a result, the fluid received at the first port 108 flows through the main chamber 116 and the flow area 300, then through the seat member main flow cross-holes 133A, 133B (now exposed), through the annular chamber 126, then through the main flow cross-holes 112A, 112B of the second port 110.

The counterbalance valve 100 can be characterized by two parameters: the pressure setting $P_{CBV}$ and the pilot ratio $P_R$. The pressure setting $P_{CBV}$ can also be referred to as the crack pressure of the counterbalance valve 100 and may be determined as:

$$P_{CBV} = \frac{F_{CBV} + F_3}{A_1} \quad (1)$$

where $F_{CBV}$ is the force applied by the pressure setting spring 150 on the poppet 130 in the distal direction as described above and $F_3$ is defined above.

The pilot ratio $P_R$ is determined as a ratio between the effective annular surface area $(A_3-A_1)$ on which the pilot pressure fluid signal acts divided by the cross-sectional surface area $A_1$ of the distal end face of the poppet 130. Thus, the pilot ratio $P_R$ is determined as $$P_R = \frac{A_3 - A_1}{A_1}.$$

In examples, the effective annular surface area $(A_3-A_1)$ is greater than the surface area $A_1$ and the pilot ratio can thus be greater than 1. In some applications, however, the areas can be equal and the pilot ratio can be equal to 1.

The pilot ratio $P_R$ determines how the pressure setting $P_{CBV}$ of the counterbalance valve 100 changes as the pilot pressure (i.e., the pressure level of the pilot pressure fluid signal at the pilot port 138) changes. As an example, a 3:1 pilot ratio indicates that an increase of 10 bar, for instance, in the pilot pressure decreases the pressure setting $P_{CBV}$ by 30 bar.

With this configuration, the force that the pilot pressure fluid signal applies to the poppet 130 assists the fluid received at the first port 108 in overcoming the combination of the force $F_{CBV}$ applied to the poppet 130 in the distal direction by the pressure setting spring 150 and the third fluid force $F_3$. In other words, the force that the fluid received at the first port 108 needs to apply to the poppet 130 to cause the poppet 130 to move axially in the proximal direction is reduced to a predetermined force value that is based on the pressure level of the pilot pressure fluid signal. As such, the force resulting from the pilot pressure fluid signal received at the pilot port 138 effectively reduces the pressure setting $P_{CBV}$ of the counterbalance valve 100, and a reduced pressure level at the first port 108 can cause the counterbalance valve 100 to open.

Notably, the counterbalance valve 100 would have a predictable performance if the sensed pressure signal provided from the second port 110 to the spring chamber 148 is stable, e.g., has a stable pressure level. The main flow region at the seat member main flow cross-holes 133A, 133B and the flow area 300 is characterized by turbulent flow where fluid has local fluctuations in fluid pressure and speed. If the sensed pressure signal is provided from such turbulent region to the spring chamber 148, fluid pressure in the spring chamber 148 may fluctuate, and might thus unintentionally increase the pressure setting, which may be undesired.

The counterbalance valve 100 advantageously senses the pressure level of fluid of the second port 110 via the sensing port 134 at a sensing region that is shifted and separated from the main flow region. This way, the sensed fluid signal provided to the spring chamber 148 may be a stable signal.

Figure 4:
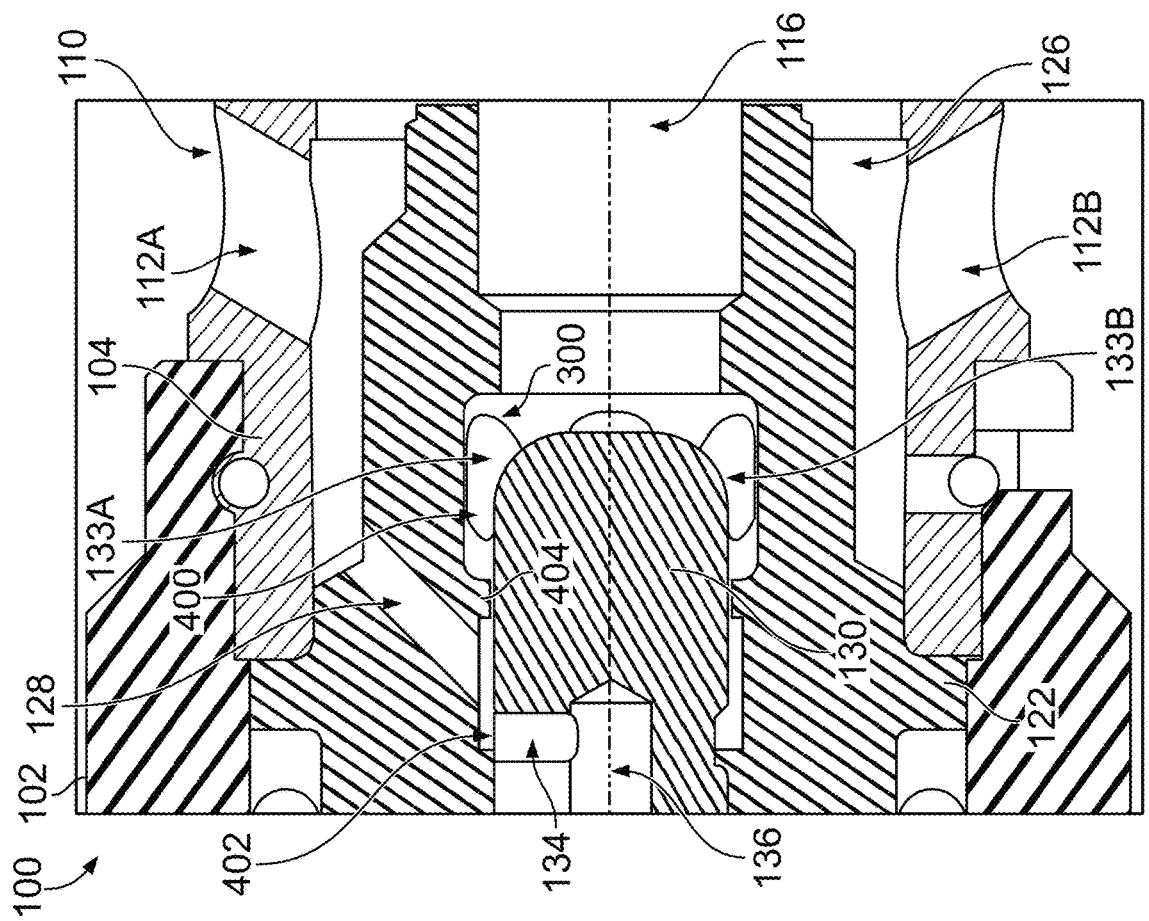
FIG. 4 illustrates a partial side cross-sectional view of the counterbalance valve of FIG. 1, in accordance with an example implementation.

FIG. 4 illustrates a partial side cross-sectional view of the counterbalance valve 100, in accordance with an example implementation. Particularly, FIG. 4 depicts a zoomed-in or enlarged view of the counterbalance valve 100 emphasizing the location of the sensing port 134 relative to a main flow region 400 about or adjacent the seat member main flow cross-holes 133A, 133B and the flow area 300.

As depicted in FIG. 4, main flow through the flow area 300 flows through the main flow region 400 between the seat member 122 and the poppet 130. Main flow from the first port 108 flows through the flow area 300 and the main flow region 400, then through the seat member main flow cross-holes 133A, 133B. The main flow region 400 may be characterized by turbulent flow (e.g., fluid having fluctuations in pressure and speed) as a large flow rate of fluid is flowing therethrough. If the sensing pressure signal provided from the second port 110 to the spring chamber 148 is sensed from the main flow region 400, such turbulence would propagate to the spring chamber 148, causing fluctuations in the pressure level therein. This may cause the poppet 130 to move in the distal direction, thereby unintentionally and undesirably adding a certain pressure margin to the pressure setting of a valve.

In the counterbalance valve 100, however, the sensing pressure signal is "picked up" or sensed at a sensing flow region 402 that is shifted axially and separated from the main flow region 400. The sensing flow region 402 may thus be protected from the turbulence of the main flow region 400, and may be characterized by less or no turbulence compared to the main flow region 400. Therefore, the pressure signal provided to the spring chamber 148 indicating pressure level of fluid at the second port 110 may be consistent and predictable.

In an example, the seat member 122 may have an interior flanged portion 404 formed as a shoulder, protrusion or rim that protrudes inward toward the poppet 130. The interior flanged portion 404 may further isolate the main flow region 400 form the sensing flow region 402, thereby further reducing or eliminating any turbulence at the sensing flow region 402.

Further, in examples, the poppet 130 may have a spherical tip that approximates a variable angle seat. This configuration may improve modulation or control of small fluid flow rates through the counterbalance valve 100.

Figure 5:
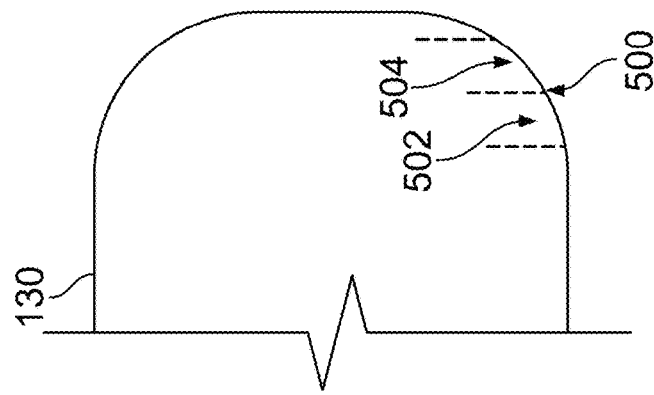
FIG. 5 illustrates a partial view of a poppet having a spherical tip, in accordance with an example implementation.

FIG. 5 illustrates a partial view of the poppet 130 having a spherical tip 500, in accordance with an example implementation. The spherical tip 500 provides or operates as a variable rate metering edge.

As the poppet 130 moves off the poppet seat 132, fluid first flows across a portion 502 of the spherical tip 500 that has an acute angle (e.g., 20 degrees). This causes a minimal opening (e.g., the flow area 300 is minimal) and a large pressure drop as fluid flows through the flow area 300. As the poppet 130 moves further off the poppet seat 132, the angle increases (e.g., to about 45 degrees) at portion 504 of the spherical tip 500, thereby increasing fluid flow rate and reducing the pressure drop across the flow area 300. This configuration may thus allow for precise control at low flow rates as the counterbalance valve 100 "cracks" open (e.g., as the poppet 130 moves slightly off the poppet seat 132), thereby enhancing stability and flow control at small flow rates.

The counterbalance valve 100 can also operate in a pressure relief mode. In the pressure relief mode, the counterbalance valve 100 could be used to control or limit pressure level in a hydraulic system. Particularly, the counterbalance valve 100 is configured to open when pressure level of fluid received at the first port 108 reaches a predetermined set pressure determined by the pressure setting spring 150, without assistance from a pilot pressure signal.

The pressure relief mode can provide for thermal relief in some applications. For example, if the first port 108 of the counterbalance valve 100 is fluidly coupled to a chamber of a hydraulic actuator via fluid line, and the fluid in the chamber expands due to a rise in temperature during operation, fluid can expand, thereby increasing pressure level in the fluid line. To provide relief for such expanded fluid and limit the rise in pressure level, the counterbalance valve 100 can open to relieve the fluid to the second port 110.

Figure 6:
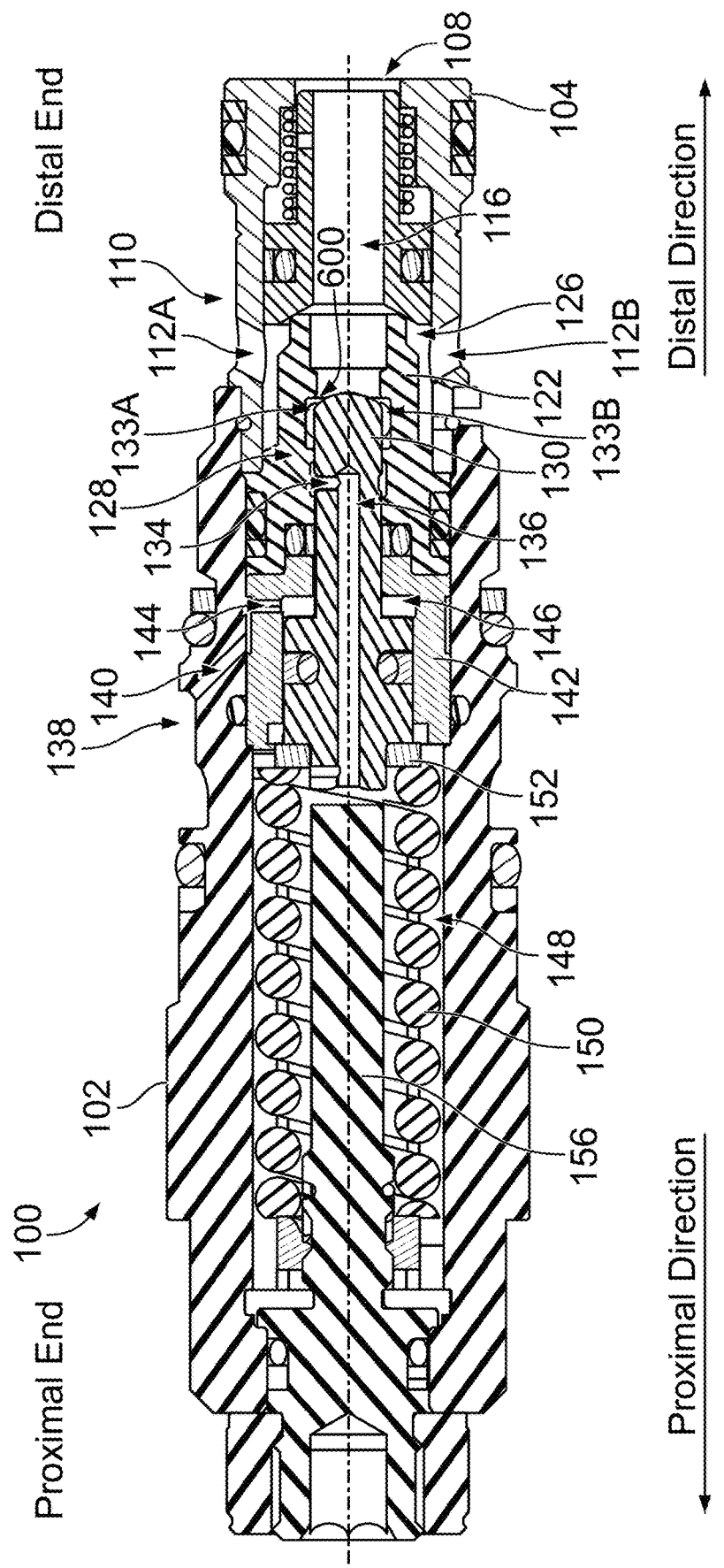
FIG. 6 illustrates a cross-sectional side view of the counterbalance valve of FIG. 1 operating in a pressure relief mode of operation, in accordance with an example implementation.

FIG. 6 illustrates a cross-sectional side view of the counterbalance valve 100 operating in a pressure relief mode, in accordance with an example implementation. In this mode of operation, the fluid at the first port 108 applies a first fluid force on the poppet 130 in the proximal direction, whereas fluid from the second port 110 is communicated to the spring chamber 148 as described above and applies a second fluid force on the poppet 130 in the distal direction along with the biasing force of the pressure setting spring 150.

When the first fluid force overcomes the combination of the second fluid force and the biasing force, the poppet 130 moves off the poppet seat 132, forming a flow area 600. In the pressure relief mode, the pressure level at the first port 108 that causes the counterbalance valve 100 to open is higher than the pressure level that opens the counterbalance valve 100 in the operation mode shown in FIG. 3. That is because in the pressure relief mode, no pilot pressure fluid signal is received at the pilot port 138 to assist the fluid received at the first port 108 in pushing the poppet 130 in the proximal direction. Also, as a result of the absence of a pilot pressure fluid signal, the distance that the poppet 130 moves in the proximal direction in the pressure relief mode is smaller than the distance that it moves when a high pressure pilot fluid signal is provided to the pilot port 138 as in FIG. 3. This is evident by comparing the flow area 600 in FIG. 6 to the flow area 300 in FIG. 3. The flow area 600 is smaller than the flow area 300 as the poppet 130 has moved by a smaller axial displacement in FIG. 6 compared to FIG. 3. As the poppet 130 is unseated, fluid is relieved from the first port 108 to the second port 110.

Advantageously, as mentioned above with respect to FIG. 4, the sensing pressure signal provided from the second port 110 to the spring chamber 148 via the sensing port 134 is sensed from the sensing flow region 402, not from the main flow region 400. This causes the sensing pressure signal to be consistent as it is picked up or sensed from a less turbulent flow zone. As a result, the pressure setting of the counterbalance valve 100 may be consistent and predictable based on flow rate.

Figure 7A:
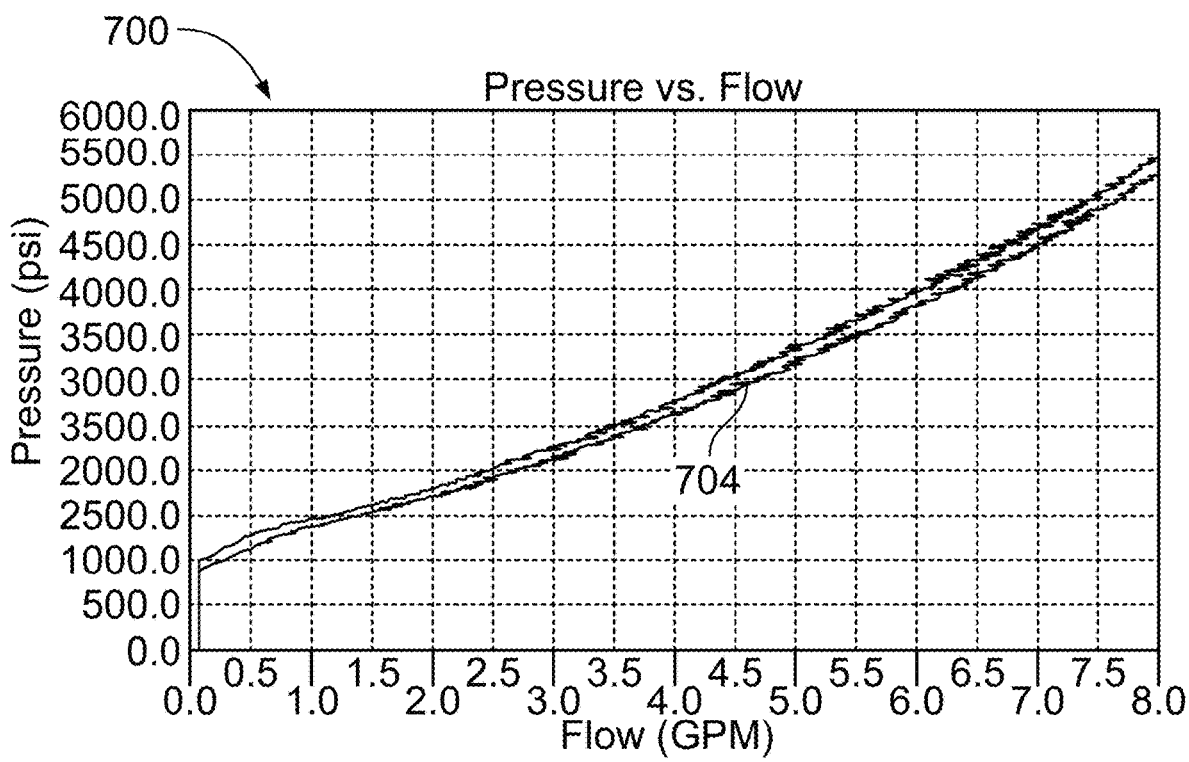
FIG. 7A is a graph showing a curve tracing pressure at a first port versus fluid flow rate from the first port to a second port when a sensing signal is provided from a main flow region, in accordance with an example implementation.
Figure 7B:
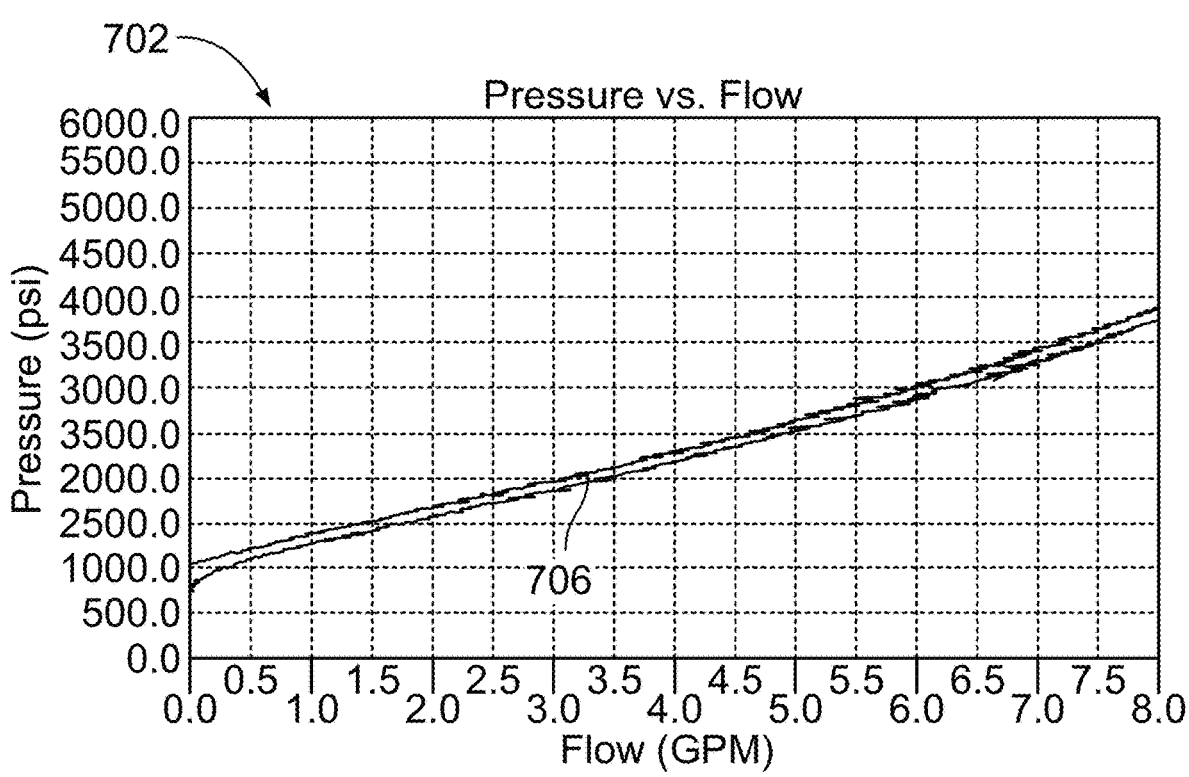
FIG. 7B is a graph showing a curve tracing pressure at the first port versus fluid flow rate from the first port to the second port when a sensing signal is provided from the sensing flow region that is shifted axially from the main flow region, in accordance with an example implementation.

FIG. 7A is a graph 700 showing a curve 704 tracing pressure at the first port 108 versus fluid flow rate from the first port 108 to the second port 110 when a sensing signal is provided from the main flow region 400, and FIG. 7B is a graph 702 showing a curve 706 tracing pressure at the first port 108 versus fluid flow rate from the first port 108 to the second port 110 when a sensing signal is provided from the sensing flow region 402 that is shifted axially from the main flow region 400, in accordance with an example implementation. The curves 704, 706 are generated in the pressure relief mode of FIG. 6. Pressure is represented on the y-axis in pounds per square inch (psi) and flow is represented on the x-axis in gallons per minute (GPM).

Comparing the curve 704 to the curve 706 illustrates that the pressure relief value at a given flow in FIG. 7A where the sensing pressure signal is provided from the turbulent zone of the main flow region 400 is higher compared to FIG. 7B where the sensing pressure signal is provided from sensing flow region 402, which is protected or separated, from the turbulent flow region. Further, for a unit flow rate increase, the corresponding increase in pressure relief value as indicated by the curve 704 is higher than that indicated by the curve 706. In particular, as an example, the curve 704 indicates that the pressure relief value increases by about 535 psi/GPM, where in the curve 706 indicates that the pressure relief value increases aby about 355 psi/GPM. In other words, the curve 706 is a flatter (e.g., has a smaller slope) than the curve 704.

Such increase in the pressure relief value in the graph 700 may be caused by providing a the sensing pressure signal from the main flow region 400, which has turbulent flow, causing the sensing pressure signal to have a higher pressure level. Such higher pressure level may nudge the poppet 130 in the distal direction, thereby restricting the flow area 600 compared to when the sensing pressure signal is provided from the sensing flow region 402.

Figure 8:
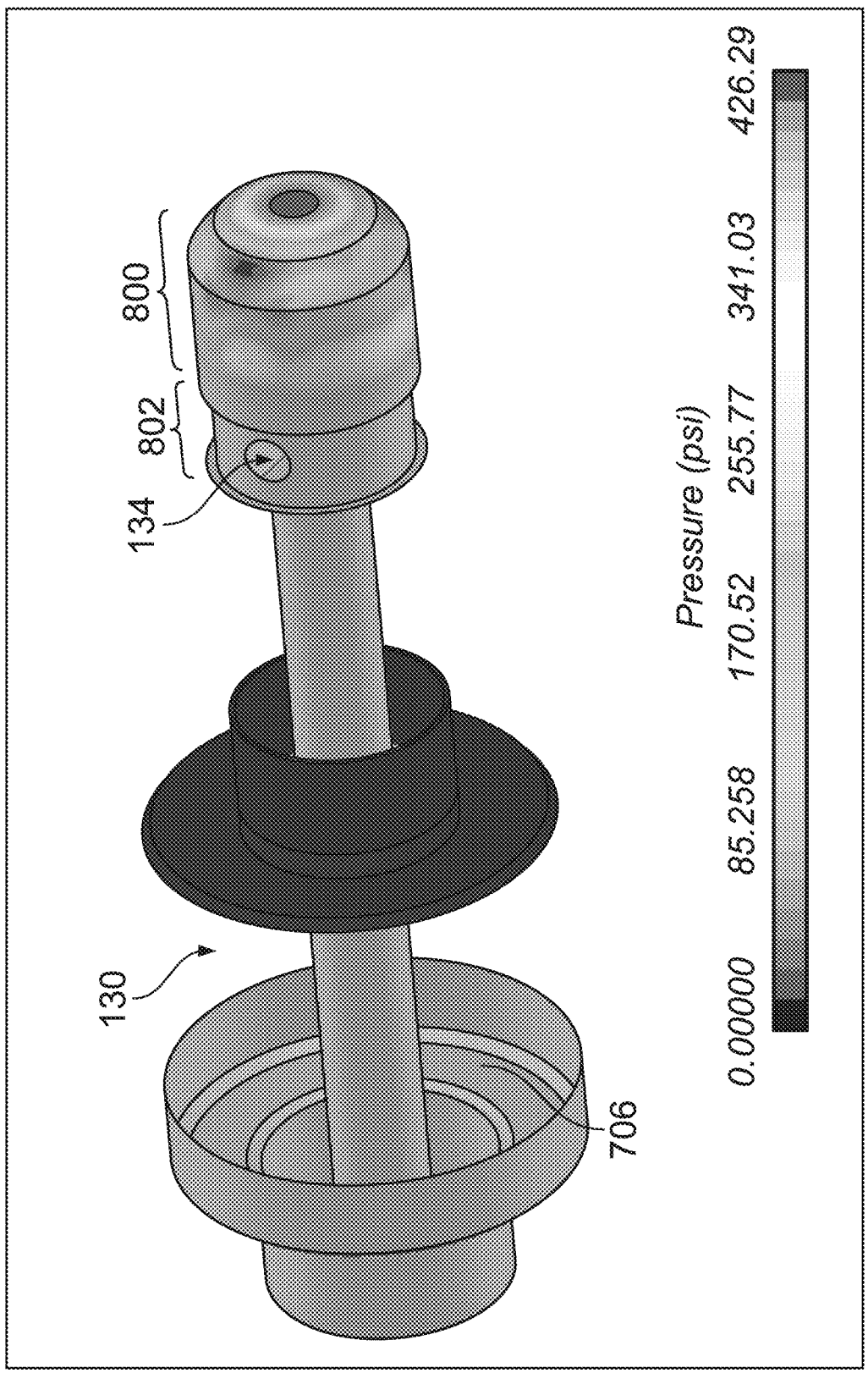
FIG. 8 illustrates a perspective view of a poppet showing pressure distribution resulting from a computational fluid dynamics analysis, in accordance with an example implementation.

FIG. 8 illustrates a perspective view of the poppet 130 showing pressure distribution resulting from a computational fluid dynamics (CFD) analysis, in accordance with an example implementation. The CFD results in FIG. 8 show a first portion 800 of the poppet 130, which is exposed to the main flow region 400, is subjected to higher and variable pressure levels.

On the other hand, the poppet 130 has a second portion 802 that is shifted proximally from the first portion 800 and is exposed to fluid in the sensing flow region 402, away from the turbulence of the main flow region 400. Thus, the second portion 802 is subjected to fluid having a consistent, low pressure level. As depicted, the sensing port 134 is located in the second portion 802, away from the turbulence of the main flow region 400, rendering the pressure relief values in the curve 706 lower as described above.

The counterbalance valve 100 can further operate in a reverse flow mode. In this mode, the counterbalance valve 100 allows reverse flow from the second port 110 to the first port 108.

Figure 9:
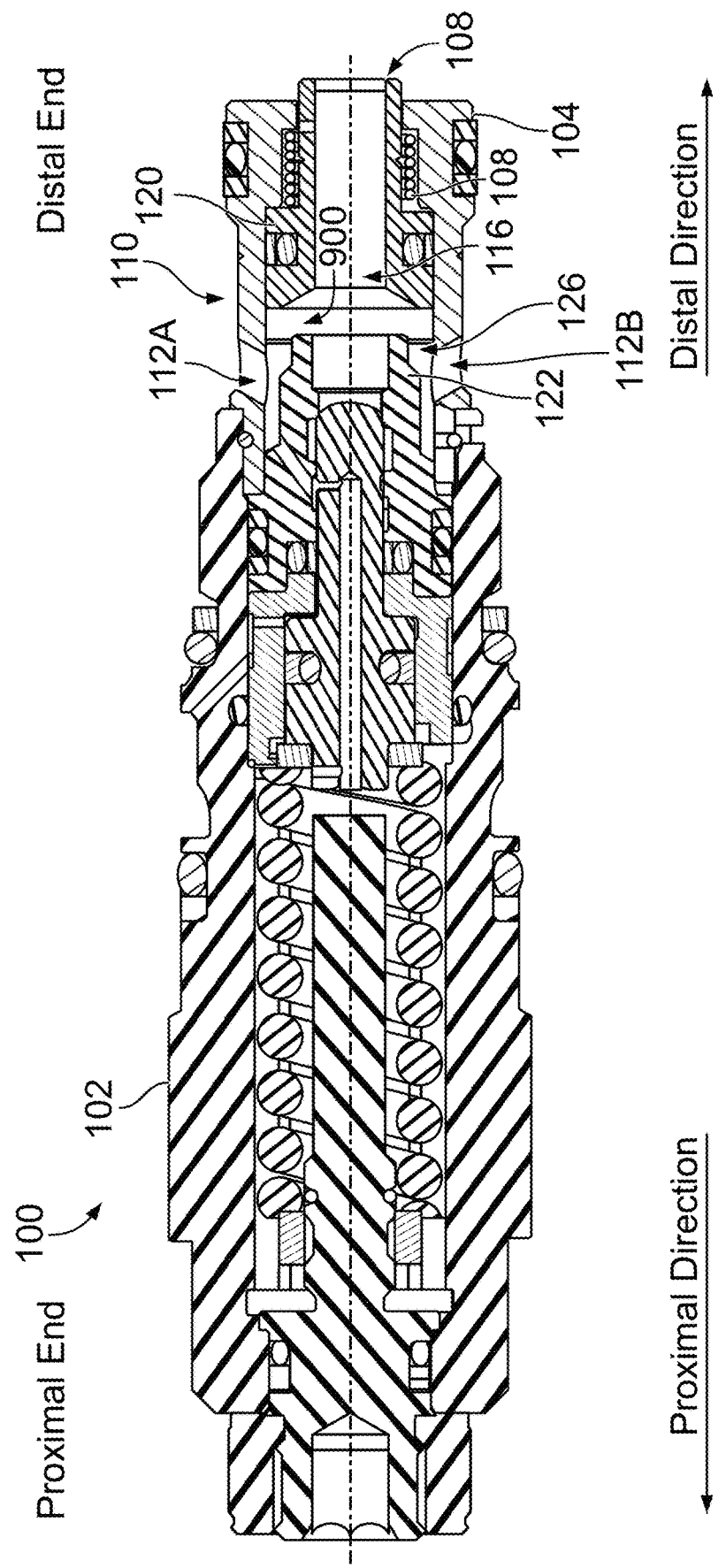
FIG. 9 illustrates a cross-sectional side view of the counterbalance valve of FIG. 1 operating in a reverse flow mode, in accordance with an example implementation.

FIG. 9 illustrates a cross-sectional side view of the counterbalance valve 100 operating in a reverse flow mode, in accordance with an example implementation. In this mode of operation, fluid received at the second port 110 flows through the main flow cross-holes 112A, 112B and the annular chamber 126, and then applies a respective fluid force on the reverse flow piston 114 in the distal direction against the reverse flow check spring 118.

Once the force applied by the fluid received at the second port 110 on the reverse flow piston 114 overcomes the force of the reverse flow check spring 118, the reverse flow piston 114 moves or is displaced in the distal direction and moves off the piston seat 124 (see FIG. 1). As a result of displacement of the reverse flow piston 114, a gap or flow area 900 is formed between the reverse flow piston 114 and the seat member 122 as depicted in FIG. 9. Fluid received at the second port 110 can then flow through the flow area 900 and the main chamber 116 to the first port 108.

FIG. 10 is a flowchart of a method 1000 for operating the counterbalance valve 100, in accordance with an example implementation. The method 1000 may include one or more operations, functions, or actions as illustrated by one or more of blocks 1002-1012. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 1002, the method 1000 includes applying a first fluid force on the poppet 130 of the counterbalance valve 100 in a proximal direction, wherein the counterbalance valve 100 comprises the first port 108, the second port 110, and the pilot port 138, and wherein the first fluid force is applied by fluid received at the first port 108, wherein the poppet 130 comprises the sensing port 134 that is exposed to fluid at the sensing flow region 402 fluidly coupled to the second port 110.

At block 1004, the method 1000 includes applying a second fluid force on the poppet 130 in the proximal direction by a pilot pressure fluid signal received at the pilot port 138.

At block 1006, the method 1000 includes applying a biasing force on the poppet 130 in a distal direction by the pressure setting spring 150 disposed in the spring chamber 148.

At block 1008, the method 1000 includes providing a sensing signal from the second port 110 to the spring chamber 148 via the sensing flow region 402 and the sensing port 134.

At block 1010, the method 1000 includes applying a third fluid force on the poppet 130 in the distal direction by the sensing signal.

At block 1012, the method 1000 includes moving the poppet 130 to a particular axial position based on a force equilibrium between the first fluid force, the second fluid force, the third fluid force, and the biasing force to allow fluid flow from the first port 108 to the second port 110 via the main flow region 400, wherein the sensing flow region 402 is shifted axially from the main flow region 400 such that the sensing flow region 402 and the sensing port 134 of the poppet 130 are separated from turbulent flow in the main flow region 400.

The method 1000 can include any further steps described throughout his disclosure.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a counterbalance valve comprising: a plurality of ports comprising: a first port, a second port, and a pilot port configured to receive a pilot pressure fluid signal; a poppet configured to move axially to allow fluid flow from the first port to the second port via a main flow region, wherein the poppet comprises a sensing port that is exposed to fluid at a sensing flow region, wherein the sensing flow region is fluidly coupled to the second port and is shifted axially from the main flow region such that the sensing flow region is separated from turbulent flow in the main flow region; and a pressure setting spring disposed in a spring chamber and applying a biasing force on the poppet in a distal direction, wherein the spring chamber is fluidly coupled to the sensing flow region via the sensing port of the poppet, wherein the poppet is configured to be subjected to (i) a first fluid force by fluid received at the first port acting on the poppet in a proximal direction, (ii) a second fluid force by the pilot pressure fluid signal received at the pilot port acting on the poppet in the proximal direction, and (iii) a third fluid force by fluid of the second port communicated to the spring chamber via the sensing port and acting on the poppet in the distal direction, and wherein the poppet is configured to move to a particular axial position based on a force equilibrium between the first fluid force, the second fluid force, the third fluid force, and the biasing force to allow fluid flow from the first port to the second port.

EEE 2 is the counterbalance valve of EEE 1, further comprising: a seat member, wherein the poppet is disposed, at least partially, within the seat member, wherein the seat member forms a poppet seat therein, and wherein the poppet is configured to be seated at the poppet seat to prevent fluid flow from the first port to the second port until the first fluid force and the second fluid force overcome the third fluid force and the biasing force.

EEE 3 is the counterbalance valve of EEE 2, wherein the main flow region is formed between the poppet and the seat member as the poppet moves in the proximal direction off the poppet seat.

EEE 4 is the counterbalance valve of any of EEEs 2-3, wherein the sensing flow region is formed between the poppet and the seat member, such that the sensing flow region, to which the sensing port is exposed, is disposed away from the main flow region to be protected from turbulent flow in the main flow region.

EEE 5 is the counterbalance valve of any of EEEs 2-3, wherein the seat member has an interior flanged portion formed as a protrusion configured to isolate the sensing flow region form the main flow region, thereby further reducing turbulence at the sensing flow region.

EEE 6 is the counterbalance valve of any of EEEs 2-5, wherein the seat member has a seat member sensing cross-hole that is fluidly coupled to the second port, and wherein the sensing port of the poppet is fluidly coupled to the seat member sensing cross-hole via the sensing flow region.

EEE 7 is the counterbalance valve of any of EEEs 2-6, wherein the seat member comprises a plurality of seat member main flow cross-holes that are fluidly coupled to the second port, wherein when the poppet is seated at the poppet seat, the poppet blocks the plurality of seat member main flow cross-holes to prevent fluid flow from the first port to the second port.

EEE 8 is the counterbalance valve of EEE 7, wherein as the poppet moves axially, the plurality of seat member main flow cross-holes are exposed to allow flow from the first port to the second port via the main flow region, wherein the main flow region is upstream of the plurality of seat member main flow cross-holes.

EEE 9 is the counterbalance valve of any of EEEs 1-8, wherein the poppet has a spherical tip.

EEE 10 is the counterbalance valve of any of EEEs 1-9, further comprising: a housing comprising the pilot port; and a sleeve disposed, at least partially, in the housing, wherein the sleeve comprises the first port and the second port.

EEE 11 is the counterbalance valve of EEE 10, further comprising: a spacer disposed within the housing around the poppet, wherein the spacer includes a spacer cross-hole configured to communicates the pilot pressure fluid signal received at the pilot port to the poppet to apply the second fluid force thereon.

EEE 12 is the counterbalance valve of any of EEEs 1-11, further comprising: a seat member, wherein the poppet is disposed, at least partially, within the seat member; a reverse flow piston disposed at the first port and configured to move axially; and a reverse flow check spring that biases the reverse flow piston to be seated at a piston seat formed by a distal end of the seat member, wherein the reverse flow piston is configured to move in the distal direction by fluid from the second port applying a respective fluid force on the reverse flow piston against the reverse flow check spring to allow fluid flow from the second port to the first port.

EEE 13 is the counterbalance valve of any of EEEs 1-12, further comprising: an adjustable nut interfacing with the pressure setting spring; and an adjusting pin threadedly engaged with the adjustable nut such that rotating the adjusting pin causes the adjustable nut to move axially and change a length of the pressure setting spring, thereby changing the biasing force acting on the poppet in the distal direction.

EEE 14 is a method of operating the counterbalance valve of any of EEEs 1-13. For example, the method comprises: applying a first fluid force on a poppet of a counterbalance valve in a proximal direction, wherein the counterbalance valve comprises a first port, a second port, and a pilot port, and wherein the first fluid force is applied by fluid received at the first port, wherein the poppet comprises a sensing port that is exposed to fluid at a sensing flow region fluidly coupled to the second port; applying a second fluid force on the poppet in the proximal direction by a pilot pressure fluid signal received at the pilot port; applying a biasing force on the poppet in a distal direction by a pressure setting spring disposed in a spring chamber; and providing a sensing signal from the second port to the spring chamber via the sensing flow region and the sensing port; applying a third fluid force on the poppet in the distal direction by the sensing signal; and moving the poppet to a particular axial position based on a force equilibrium between the first fluid force, the second fluid force, the third fluid force, and the biasing force to allow fluid flow from the first port to the second port via a main flow region, wherein the sensing flow region is shifted axially from the main flow region such that the sensing flow region and the sensing port of the poppet are separated from turbulent flow in the main flow region.

EEE 15 is the method of EEE 14, wherein the counterbalance valve further comprises an adjustable nut interfacing with the pressure setting spring, wherein the method further comprises: moving the adjustable nut axially to change a length of the pressure setting spring, thereby changing the biasing force acting on the poppet in the distal direction.

EEE 16 is the method of any of EEEs 14-15, wherein the counterbalance valve comprises a seat member, wherein the poppet is disposed, at least partially, within the seat member, wherein the seat member forms a poppet seat therein, and wherein the method further comprises: causing the poppet to be seated at the poppet seat to prevent fluid flow from the first port to the second port until the first fluid force and the second fluid force overcome the third fluid force and the biasing force.

EEE 17 is the method of EEE 16, wherein the main flow region is formed between the poppet and the seat member as the poppet moves in the proximal direction off the poppet seat, and wherein the method further comprises: isolating the sensing flow region from the main flow region to protect the sensing port from turbulent flow in the main flow region.

EEE 18 is the method of EEE 17, wherein the seat member has an interior flanged portion formed as a protrusion, and wherein isolating the sensing flow region from the main flow region comprises: isolating the sensing flow region from the main flow region via the interior flanged portion.

EEE 19 is the method of any of EEEs 16-18, wherein the seat member has a seat member sensing cross-hole that is fluidly coupled to the second port, and wherein the method further comprises: fluidly coupling the sensing port of the poppet to the seat member sensing cross-hole via the sensing flow region.

EEE 20 is the method of any of EEEs 16-19, wherein the seat member comprises a plurality of seat member main flow cross-holes that are fluidly coupled to the second port, wherein when the poppet is seated at the poppet seat, the poppet blocks the plurality of seat member main flow cross-holes to prevent fluid flow from the first port to the second port, and wherein moving the poppet to the particular axial position comprises: exposing the plurality of seat member main flow cross-holes to allow flow from the first port to the second port via the main flow region, wherein the main flow region is upstream of the plurality of seat member main flow cross-holes.

What is claimed is:

1. A counterbalance valve comprising:
    a plurality of ports comprising: a first port, a second port, and a pilot port configured to receive a pilot pressure fluid signal;
    a poppet configured to move axially to allow fluid flow from the first port to the second port via a main flow region, wherein the poppet comprises a sensing port that is exposed to fluid at a sensing flow region, wherein the sensing flow region is fluidly coupled to the second port and is shifted axially from the main flow region;
    a seat member, wherein the poppet is disposed, at least partially, within the seat member, wherein the seat member has an interior flanged portion formed as a protrusion configured to isolate the sensing flow region form the main flow region, thereby reducing turbulence at the sensing flow region; and
    a pressure setting spring disposed in a spring chamber and applying a biasing force on the poppet in a distal direction, wherein the spring chamber is fluidly coupled to the sensing flow region via the sensing port of the poppet, wherein the poppet is configured to be subjected to (i) a first fluid force by fluid received at the first port acting on the poppet in a proximal direction, (ii) a second fluid force by the pilot pressure fluid signal received at the pilot port acting on the poppet in the proximal direction, and (iii) a third fluid force by fluid of the second port communicated to the spring chamber via the sensing port and acting on the poppet in the distal direction, and wherein the poppet is configured to move to a particular axial position based on a force equilibrium between the first fluid force, the second fluid force, the third fluid force, and the biasing force to allow fluid flow from the first port to the second port.

2. The counterbalance valve of claim 1, wherein the seat member forms a poppet seat therein, and wherein the poppet is configured to be seated at the poppet seat to prevent fluid flow from the first port to the second port until the first fluid force and the second fluid force overcome the third fluid force and the biasing force.

3. The counterbalance valve of claim 1, wherein the main flow region is formed between the poppet and the seat member as the poppet moves in the proximal direction off the poppet seat.

4. The counterbalance valve of claim 1, wherein the sensing flow region is formed as an annular area between the poppet and the seat member, such that the sensing flow region, to which the sensing port is exposed, is disposed away from the main flow region to be protected from turbulent flow in the main flow region.

5. The counterbalance valve of claim 1, wherein the seat member has a seat member sensing cross-hole that is fluidly coupled to the second port, and wherein the sensing port of the poppet is fluidly coupled to the seat member sensing cross-hole via the sensing flow region.

6. A counterbalance valve comprising:
    a plurality of ports comprising: a first port, a second port, and a pilot port configured to receive a pilot pressure fluid signal;
    a poppet configured to move axially to allow fluid flow from the first port to the second port via a main flow region, wherein the poppet comprises a sensing port that is exposed to fluid at a sensing flow region, wherein the sensing flow region is fluidly coupled to the second port and is shifted axially from the main flow region such that the sensing flow region is separated from turbulent flow in the main flow region;
    a seat member, wherein the poppet is disposed, at least partially, within the seat member, wherein the seat member forms a poppet seat therein, wherein the seat member comprises a plurality of seat member main flow cross-holes that are fluidly coupled to the second port, wherein when the poppet is seated at the poppet seat, the poppet blocks the plurality of seat member main flow cross-holes to prevent fluid flow from the first port to the second port; and
    a pressure setting spring disposed in a spring chamber and applying a biasing force on the poppet in a distal direction, wherein the spring chamber is fluidly coupled to the sensing flow region via the sensing port of the poppet, wherein the poppet is configured to be subjected to (i) a first fluid force by fluid received at the first port acting on the poppet in a proximal direction, (ii) a second fluid force by the pilot pressure fluid signal received at the pilot port acting on the poppet in the proximal direction, and (iii) a third fluid force by fluid of the second port communicated to the spring chamber via the sensing port and acting on the poppet in the distal direction, and wherein the poppet is configured to move to a particular axial position based on a force equilibrium between the first fluid force, the second fluid force, the third fluid force, and the biasing force to allow fluid flow from the first port to the second port.

7. The counterbalance valve of claim 6, wherein as the poppet moves axially, the plurality of seat member main flow cross-holes are exposed to allow flow from the first port to the second port via the main flow region, wherein the main flow region is upstream of the plurality of seat member main flow cross-holes.

8. The counterbalance valve of claim 1, wherein the poppet has a spherical tip.

9. The counterbalance valve of claim 1, further comprising:
    a housing comprising the pilot port; and
    a sleeve disposed, at least partially, in the housing, wherein the sleeve comprises the first port and the second port.

10. The counterbalance valve of claim 9, further comprising:
    a spacer disposed within the housing around the poppet, wherein the spacer includes a spacer cross-hole configured to communicates the pilot pressure fluid signal received at the pilot port to the poppet to apply the second fluid force thereon.

11. The counterbalance valve of claim 1, further comprising:
    a reverse flow piston disposed at the first port and configured to move axially; and
    a reverse flow check spring that biases the reverse flow piston to be seated at a piston seat formed by a distal end of the seat member, wherein the reverse flow piston is configured to move in the distal direction by fluid from the second port applying a respective fluid force on the reverse flow piston against the reverse flow check spring to allow fluid flow from the second port to the first port.

12. The counterbalance valve of claim 1, further comprising:
    an adjustable nut interfacing with the pressure setting spring; and
    an adjusting pin threadedly engaged with the adjustable nut such that rotating the adjusting pin causes the adjustable nut to move axially and change a length of the pressure setting spring, thereby changing the biasing force acting on the poppet in the distal direction.

13. A method comprising:

applying a first fluid force on a poppet of a counterbalance valve in a proximal direction, wherein the counterbalance valve comprises a first port, a second port, and a pilot port, and wherein the first fluid force is applied by fluid received at the first port, wherein the poppet comprises a sensing port that is exposed to fluid at a sensing flow region fluidly coupled to the second port, wherein the counterbalance valve comprises a seat member, wherein the poppet is disposed, at least partially, within the seat member, wherein the seat member forms a poppet seat therein, and wherein the seat member comprises a plurality of seat member main flow cross-holes that are fluidly coupled to the second port, wherein when the poppet is seated at the poppet seat, the poppet blocks the plurality of seat member main flow cross-holes to prevent fluid flow from the first port to the second port;

applying a second fluid force on the poppet in the proximal direction by a pilot pressure fluid signal received at the pilot port;

applying a biasing force on the poppet in a distal direction by a pressure setting spring disposed in a spring chamber; and providing a sensing signal from the second port to the spring chamber via the sensing flow region and the sensing port;

applying a third fluid force on the poppet in the distal direction by the sensing signal; and moving the poppet to a particular axial position based on a force equilibrium between the first fluid force, the second fluid force, the third fluid force, and the biasing force to allow fluid flow from the first port to the second port via a main flow region, wherein the sensing flow region is shifted axially from the main flow region such that the sensing flow region and the sensing port of the poppet are separated from turbulent flow in the main flow region, and wherein moving the poppet to the particular axial position comprises: exposing the plurality of seat member main flow cross-holes to allow flow from the first port to the second port via the main flow region, wherein the main flow region is upstream of the plurality of seat member main flow cross-holes.

14. The method of claim 13, wherein the counterbalance valve further comprises an adjustable nut interfacing with the pressure setting spring, wherein the method further comprises:

moving the adjustable nut axially to change a length of the pressure setting spring, thereby changing the biasing force acting on the poppet in the distal direction.

15. The method of claim 13, wherein the method further comprises:

causing the poppet to be seated at the poppet seat to prevent fluid flow from the first port to the second port until the first fluid force and the second fluid force overcome the third fluid force and the biasing force.

16. The method of claim 15, wherein the main flow region is formed between the poppet and the seat member as the poppet moves in the proximal direction off the poppet seat, and wherein the method further comprises:

isolating the sensing flow region from the main flow region to protect the sensing port from turbulent flow in the main flow region.

17. The method of claim 16, wherein the seat member has an interior flanged portion formed as a protrusion, and wherein isolating the sensing flow region from the main flow region comprises:

isolating the sensing flow region from the main flow region via the interior flanged portion.

18. The method of claim 15, wherein the seat member has a seat member sensing cross-hole that is fluidly coupled to the second port, and wherein the method further comprises:

fluidly coupling the sensing port of the poppet to the seat member sensing cross-hole via the sensing flow region.

* * * * *